(12) United States Patent
McDevitt

(10) Patent No.: US 11,399,156 B2
(45) Date of Patent: Jul. 26, 2022

(54) SYSTEM AND METHOD FOR IMPROVED CONTENT CREATION BY MEANS OF COMBINING CONTENT FROM MULTIPLE INDIVIDUAL CONTENT CAPTURE DEVICES

(71) Applicant: John McDevitt, Clearwater, FL (US)

(72) Inventor: John McDevitt, Clearwater, FL (US)

(*) Notice: Subject to any disclaimer, the term of this patent is extended or adjusted under 35 U.S.C. 154(b) by 0 days.

(21) Appl. No.: 17/113,094

(22) Filed: Dec. 6, 2020

(65) Prior Publication Data

US 2021/0185277 A1    Jun. 17, 2021

Related U.S. Application Data

(60) Provisional application No. 62/948,774, filed on Dec. 16, 2019.

(51) Int. Cl.

| | |
|---|---|
| *H04N 7/173* | (2011.01) |
| *H04N 21/2743* | (2011.01) |
| *H04N 21/2343* | (2011.01) |
| *H04N 5/232* | (2006.01) |
| *H04N 21/258* | (2011.01) |
| *H04N 21/4788* | (2011.01) |

(52) U.S. Cl.
CPC ..... *H04N 7/17318* (2013.01); *H04N 5/23225* (2013.01); *H04N 21/23439* (2013.01); *H04N 21/25833* (2013.01); *H04N 21/2743* (2013.01); *H04N 21/4788* (2013.01)

(58) Field of Classification Search
CPC ........... H04N 7/17318; H04N 5/23225; H04N 21/23439; H04N 21/25833; H04N 21/2743; H04N 21/4788; H04N 5/23238; H04N 5/247; H04N 21/2541; H04N 21/854; H04N 21/21805; G11B 27/031
See application file for complete search history.

(56) References Cited

U.S. PATENT DOCUMENTS

| | | | | |
|---|---|---|---|---|
| 7,095,905 | B1* | 8/2006 | Peterson | H04N 5/23238 |
| | | | | 382/284 |
| 11,176,707 | B2* | 11/2021 | Koyama | G06T 7/254 |
| 2011/0280540 | A1* | 11/2011 | Woodman | H04N 21/4828 |
| | | | | 386/224 |
| 2016/0088287 | A1* | 3/2016 | Sadi | H04N 13/194 |
| | | | | 348/43 |

* cited by examiner

*Primary Examiner* — Alazar Tilahun

(57) ABSTRACT

A system and method to create original content by means of merging different content from multiple individual devices into at least one combined content set. The system includes multiple content capture devices, a database that stores media content from the multiple individual devices, a processor that merges the data content, and a server that distributes the merged content. Moreover, the merging processor applies a set of rules as to how the content is to be merged into the combined content set and the distribution server has a set of distribution rules related to how the combined content is distributed and the user(s) that can consume the combined content.

21 Claims, 5 Drawing Sheets

SYSTEM AND METHOD FOR IMPROVED CONTENT CREATION BY MEANS OF COMBINING CONTENT FROM MULTIPLE INDIVIDUAL CONTENT CAPTURE DEVICES

CROSS REFERENCE TO RELATED APPLICATION

This application claims priority to U.S. Provisional Application No. 62/948,774, entitled System and Method for Improved Content Creation By Means a Combining Content From Multiple Individual Content Capture Devices, filed on Dec. 16, 2019 the contents of which are incorporated herein by reference into the present application.

BACKGROUND OF THE INVENTION

A wide variety of digital content may be captured by a broad assortment of capture devices (e.g., digital still cameras, digital video cameras, digital audio recorders, digital data recorders, etc.). This digital content may in turn be arranged or combined in many different ways and then the combined digital content may then be distributed to and presented on a broad assortment of content presentation devices (e.g., desktop computers, laptop computers, tablet computers, personal digital assistants, smart phones, Virtual Reality/Augmented Reality/Mixed Reality viewers, media streamers (e.g., Roku, Amazon Fire TV, Apple TV, etc.), smart TVs, set-top boxes, and the like).

Moreover, recent developments in digital content capture, processing, and communication technologies enable individuals to capture and communicate digital content easily and inexpensively virtually from wherever they are—allowing for near ubiquitous, near real time sharing of content (e.g., by means of smart phones). Additionally, various precise location and time tracking technologies (these and other such data individually or as a set that helps to describe the content may be referred to as metadata) are often combined with the captured content to allow identification of where and when the content was captured. All the captured content and associated metadata may be communicated by means of wireless (e.g., 3G, 4G, 5G, etc.), wired, Wi-Fi, Bluetooth, private or public wireless internet protocol (IP) technologies, amongst others. For example, wireless data networks were developed primarily to provide voice communication services to mobile phones. However, wireless service providers now also use their wireless data networks to provide for the streaming of media content that can be sent by, received by, and viewed on consumers' mobile devices. Such streaming content may include, amongst other things, live or on-demand video (including video & audio combined) selections of videos, movies, television programming, images, or audio.

While consumer digital content capture devices (e.g., smart phones, tablets, cameras, GoPro's, drones, etc.) continue to improve, there are still limitations on the quality of their content capture technologies and while professional digital content capture devices (e.g., 8K cameras, Red cameras, etc.) have higher quality content capture functionality they are often prohibitively expensive and physically large. Thus, there are generally two distinct sets of content— several individual distinct lower-quality amateur captured content sets, and a few higher-quality professionally captured content sets. It is usually the case that the content consumer has to choose between these two separate sets for content (and usually a single content capture stream) that they want to consume, often leaving the consumer stuck with a limited and unsatisfying experience.

For example a current large popular music concert is often a sea of mobile phones of individual amateurs taking pictures or videos of the concert. Each of these individual content sets are easily shared with others or posted to social media sites (e.g., YouTube, Facebook, Twitch, Instagram, etc. in real time (or near real time) as live or as recorded content) but this content is often lower-quality and single perspective. Alternatively, there are often higher-quality professional videos being taken (usually, to be shown in real time (or near real time) as live on big screens in the venue), but this content is only consumed within the venue. These two sets of captured content present completely separate content consumption experiences for the user. Also, the amateur content is further divided into unique media files that are each captured by each individual. There is no concept of combining these content sets (or parts of the different content sets) into a collective whole that provides an improved consumer experience. Distributing each individual content set requires greater bandwidth, processor resources, server resources, and most valuably consumer's time than if improved combined content sets were created and used.

SUMMARY OF THE INVENTION

Accordingly, there is a need in the industry for a method and system that accumulates, identifies, stores, organizes, merges, evaluates, and transmits content that provides the user with the most robust content experience designed such that it would limit the unnecessary consumption of data storage, network bandwidth, presentation service resources, user device resources, user data capacity, and user time. This improved system and method would not only reduce the waste of resources but improve the user's overall content consumption experience.

The system and method disclosed herein provides for the creation of one or more digital content sets—the creation process is the combining of more than one individual digital content sets and possibly adding additional computer generated content resulting in a coordinated data set called Combined Content (CC). This combination process follows a set of rules and methodologies, in concert with databases and processors (as individual elements or as combined whole, in a single or multiple locations) that are communicatively coupled. Furthermore, the CC can be distributed toward consumer consumption devices based on a set of Distribution Rules. The digital content includes, but is not limited to, a subset of or collectively: audio, video (just images, as well as, images and audio collectively), text, images, computer generated graphics/images (including but not limited to related physics engines, logic engines, impossibility limiters, game dynamics, game play, actual content that has been manipulated, purely fake content, pure data, etc.), Virtual Reality (VR) content, Augmented Reality (AR) content, Mixed Reality (MR) content, graphical overlays, visible and invisible data, all of the elements contained in the content, and any metadata that describes or is associated with or related to the attributes of the content (including but not limited to, content capture location data, content capture time data, capture device identification data, capture device inclination data (and/or similar X, Y, Z axis angle data), capture device movement data, Capture device altitude data (e.g., a drone), capture device orientation information, capture device camera data, capture device microphone data, contextual data, content identification data, rights data, ownership data, content labeling data, use data, preference data, trend data, transactional data, and other similar data related to the content and how/when/where it was captured), collectively and any sub-set of which is hereinafter referred to as the Content. Furthermore, the Content may be live (truly live or near live—delayed by processing, and/or distribution, and/or distance to be transmitted) or pre-recorded and the live content may be truly live, or originally live and re-presented, or a combination of both. Also, the Content can be spontaneously generated or previously generated and displayed in real time (or a combination of both) as in the case of computer-generated Content, or VR/AR/MR Content. Alternatively, the Content could have never been presented live and is just previously recorded or previously created. The Content may be captured by an individual amateur (person or system), a group of amateurs, by a professional (person or system), a group of professionals, an automated capture device system(s), a computer system(s), or any combination of these. Any or all of the descriptive data or metadata about or contained in the Content (including dynamic content recognition as described in U.S. Pat. No. 9,167,304 and incorporated by reference) may be used to identify, organize, or sort the Content in the Common Storage Library.

The term rule(s) is used generically (often in the simplest form being If-Then statements) and may include one, some, or all set(s) of rules including, but not limited to, Content rules (related to inclusions, exclusions, title, content, subject matter, capture device, capture individual, date of creation, timing of creation, location of creation, angle of creation, capture device movement, language, ownership, rights, duration, rating, geographic location, maximum length, minimum length, maximum number of results, minimum number of results, quality, bit rate, Content dimensions, format, historical view count, "likes", reviews, date of consumption, rates of completion, etc.), business rules, individualized or grouped preferences, individual or grouped viewership/sales trends, and variable randomization methodologies may be in whole, partially, or individually utilized to decide which Content or sub set of Content to utilize in any given embodiment of the Combined Content (CC). Furthermore, these rules may act as logical engines that may organize, prioritize, include, exclude, change the likelihood, etc. of a given individual Content item (sub set of a Content item, or multiple Content items) to be used in the CC. The rules may be set by an individual, group, a system, a computer, or a combination of any of these. The rules may be pre-established or dynamically established, or a combination of both. The CC can be consumed on a user's content consumption device. Please note the terms "user", "viewer", "listener", "individual", and "consumer" are used interchangeably, generically, and could mean any creator/capturer of Content or consumer of any of the CC and the user could be a human individual, a group of humans, an animal or animals, another computer system, or set of systems. Additionally, the term "view" is used generically and can mean any method of consumption of the Content (e.g., read, watch, listen to, play (in relation to games), interface with, or otherwise experience). For Content sets to be different or unique they just have to be captured separately in terms of at least one of; Content capture device (or sub-device in the case where one device contains multiple Content Capture systems), time, or location.

The resulting CC may have many of the characteristics of the original source Content but due to the merging of the Content sets the CC is a more data rich experience than any of the individual sets of Content. While it is theoretically possible in the extreme case where there is one higher-quality Content set and one very lower-quality Content set that the Combined Content is highly similar to the higher-quality Content, this is unlikely because in most cases there will be multiple individual sets of Content, and even lower-quality content may contribute some unique elements of quality to create a richer CC set. However, it should also be noted that the rules could be set such that a maximum or minimum percentage of any one source Content set is used in the CC.

The resulting CC may be distributed by means of one or more of; wireless (e.g., 3G, 4G, 5G, etc.), wired, IP, Wi-Fi, Bluetooth, or similar two way communication technologies on any connected device (e.g., a smartphone, tablet, personal computer, computer system, laptop, media streamer, smart TV, smart home speaker, game console, AR/VR/MR viewers, smart home appliance, a viewing device with a set-top box type processor, or the like, individually or in combination) that can also support CC playout. The CC may be distributed as a complete discrete set, may be streamed continuously, or may be a combination of segments that are distributed in batches. Additionally, the disclosed system and method allows for the CC to be played-out on a device that allows for two way communication (in real time, near real time, or stored and forwarded) such that consumption or use data related to the CC can be collected. This two-way communication allows in some cases for common user CC playout devices to act as VR/AR/MR players in that when the playout device is moved in space the CC adapts to the movement of the playout device changing what is presented on the playout device. Furthermore, the CC rules may limit playout rights including but not limited to play/not play, only play certain sections, play specific MPAA (or similar) rated CC material (e.g., G, PG, PG-13, R, NC-17, X, XXX), play with or without advertisements, play only if content is paid for, only play in certain geographic regions, etc. This collected use data may be analyzed and interpreted by a user and or the larger system and provide data as the basis for a feedback loop that enables the system to dynamically learn and adjust the next generation of CC creation and distribution.

In some cases, the disclosed system provides for continuously or periodically changing and updating the CC such that over time the CC is different than the CC that is initially created (or alternatively there may be multiple related, but unique CC sets created in parallel (or near parallel)). These changes may be based on one or more of any relevant data such as additional individual Content sets, consumption rates, viewer reviews/feedback/"likes", viewer preferences, viewers paying for or subscription to content, sales performance (in commerce environments), resulting subsequent behavior, and any other consumption related results (both from the individual viewer and/or from a plurality of users—including up to the full population of CC consumers), and also external data sources (changes in laws, regulations, licenses, or rights related to the Content, relevant related but external data, trends of other related content, historical or current media trends, product sales trends, news events, predicted trends, etc.). The feedback loop may use various sets of information and machine learning/artificial intelligence (ML/AI) analysis to improve the user experience by creating improved CC. The disclosed system may use ML/AI systems using traditional or quantum computing methodologies to aid in combining and coordinating the individual Content sets, changing the rules, and even creating new computer generated Content to better merge or fill gaps in the existing original individual Content sets such that the CC is optimized in accordance with the rules engine. Furthermore, these ML/AI based approaches may be used specifically for improved interactive game play and/or VR/AR/MR experiences. Additionally, this system can be applied to recorded, live (or near live) Content capture situations (e.g., as an event is occurring) and be applied to open-ended and non-predetermined storytelling (in which there are not pre-defined plots or endings to CC sets, but rather they develop through use over time and can be applied to any type of Content, including Content that is created by the user (or sets of users) (e.g., in game play)). This improvement process may be utilized for future CC consumption or also even as the CC is initially being consumed and the "end" of the CC that has not yet been consumed (or created) and may be altered based on this dynamic learning methodology (and/or feedback loop) to improve the remaining CC to be consumed. Furthermore, this information may be directed to those individuals or systems that are capturing or creating Content such that they may adapt their capture or creation to the feedback information (a rapid and responsive feedback system).

In alternative embodiments, additional third-party Other Content may be used and included in the CC. By way of example, but not limitation, Other Content could be Content that is captured by commercial or professional capture equipment, or the Other Content could be computer generated Content, ML/AI Content (computer generated "fake" content or computer manipulated "real" content), URL's, links to other content (or Content, or CC), advertising Content, editorial Content, instructional Content, informational Content, or other alternative Content. Furthermore, in all cases the CC can contain any mix of Amateur Captured Content, Professional, Captured Content, and Other Content (or any mix of any sub-set of data in any of the Content Sets).

The disclosed system may be configured to utilize a set of Distribution Rules to manage and govern the distribution of the CC. Please note there is not necessarily only one version of the CC, there may be multiple sets of CC at any given time and the make-up of those sets may change over time all as governed by the Content Combination Rule Set and the rules may be applied at the population, sub-set, or individual level of either (or both) of the CC and viewer. The CC sets can grow and branch overtime developing linear and non-linear "story lines". Additionally, Combined Content Rule Set may take into consideration items such as, but not limited to, intellectual property rights of the Content, subscription rights to the Content, the network the CC is distributed over (e.g., unlimited home Wi-Fi or pay per bit delivered mobile networks, high bandwidth networks or low bandwidth networks, etc.), or the technical ability of the playout device (e.g., a speaker alone versus a HD/4K/8K television versus a VR headset, versus a smart phone). Furthermore, it should be recognized that the resulting CC may be a collection of a wide variety of different Content, including but not limited to, entertainment, education, information, commerce, gamming, security analysis, police investigations, military strategy, emergency response, crowd analysis, medical imaging, remote surgery, medical data, health data, machine data, industrial data, and the like.

As described herein, the disclosed content combination and management system provides for receiving and storing content from multiple sources, combining content sets into one or more combined content sets, and transmitting the resulting at least one combined content set toward at least one combined content user's combined content consumption device. This system includes, amongst other things; at least more than one content capture devices configured to capture at least one set of content, the at least more than one of the content capture devices are configured to transmit at least one set of content towards at least one database; at least one electronic database configured to receive and store at least more than one set of content; at least one processor communicatively coupled to the at least one electronic database, the at least one processor configured to: 1) Scan the at least more than one content sets and dynamically compare the content sets. 2) Access information stored in at least one database that contains a collection of content combination rules related to the combination of the at least more than one content sets. 3) Use, apply, and enforce the content combination rules and the at least more than one content sets to combine at least a portion of the content sets into at least one combined content set. 4) Review the combined content and add additional content to ensure the combined content is complete. 5) Access information stored in at least one database that contains a collection of combined content distribution rules related to the distribution of the at least one combined content sets. 6) at least one server configured to transmit the at least one combined content set towards a display device in accordance with the combined content distribution rules. This system is a collection of commutatively coupled parts performing in a coordinated manner resulting in coherent and harmonized CC set and user experience.

Furthermore, the content combination and management system includes amongst other things at least one processor or set of processors in which; a first processor is configured to scan the content contained in the at least one content database and combine the content in accordance with combination rules contained in a content combination rules database into an integrated combined content set, a second processor configured to access the information stored in the at least one electronic database that is related to the rules for content combination and combine the content in accordance with the combination rules, a third processor configured to review the combined content and add additional content to ensure the combined content is complete, a fourth processor configured to access the information stored in at least one electronic database that is related to the rules for combined content distribution, a fifth processor configured to transmit the combined content toward combined content consumption devices in accordance with the distribution rules, and a sixth processor that is further configured to analyze user combined content consumption information wherein the user combined content consumption information may influence the rules for content capture. Additionally, the content combination and management system includes at least one electronic database comprising a first electronic database storing the content, a second electronic database storing the information related to the rules for combining the content into combined content, and a third electronic database storing the information related to the rules for distribution the combined content.

Also, as described herein, the disclosed content combination and management system provides a method for receiving at least more than one set of content, combining at least more than one sets of content into at least one combined content set, and transmitting at least one combined content set toward at least one combined content user combined content consumption device, the method comprises amongst other things; at least one database or sets of databases to receive and store at least more than one content set; accessing content stored in the at least one electronic database that is related to the at least more than one content set; accessing information stored in the at least one electronic database that is related to the at least one content combination rule set; combining the at least more than one content sets into a combined content set in accordance with at least one combined content rule set; evaluating the resulting combined content set and adding any needed additional content to create a fully compliant combined content set; accessing information stored in the at least one electronic database that is related to the at least one distribution rule set; and transmitting the combined content toward at least one combined content display device in accordance with the at least one distribution rule set. This method is a collection of commutatively coupled processes performing in a coordinated manner resulting in coherent and harmonized combined content set and user experience.

Furthermore, the content combination and management method includes amongst other things at least one processor or set of processors which scans the content contained in the content database and combine the content in accordance with combination rules contained in a content combination rules database into an integrated combined content set; accesses the information stored in the at least one electronic database that is related to the rules for content combination and combine the content in accordance with the combination rules; reviews the combined content and add additional content to ensure the combined content is complete; accesses the information stored in at least one electronic database that is related to the rules for combined content distribution; transmits the combined content toward combined content consumption devices in accordance with the distribution rules, and wherein the user combined content consumption information may influence content capture.

DETAILED DESCRIPTION OF THE INVENTION

Figure 1:
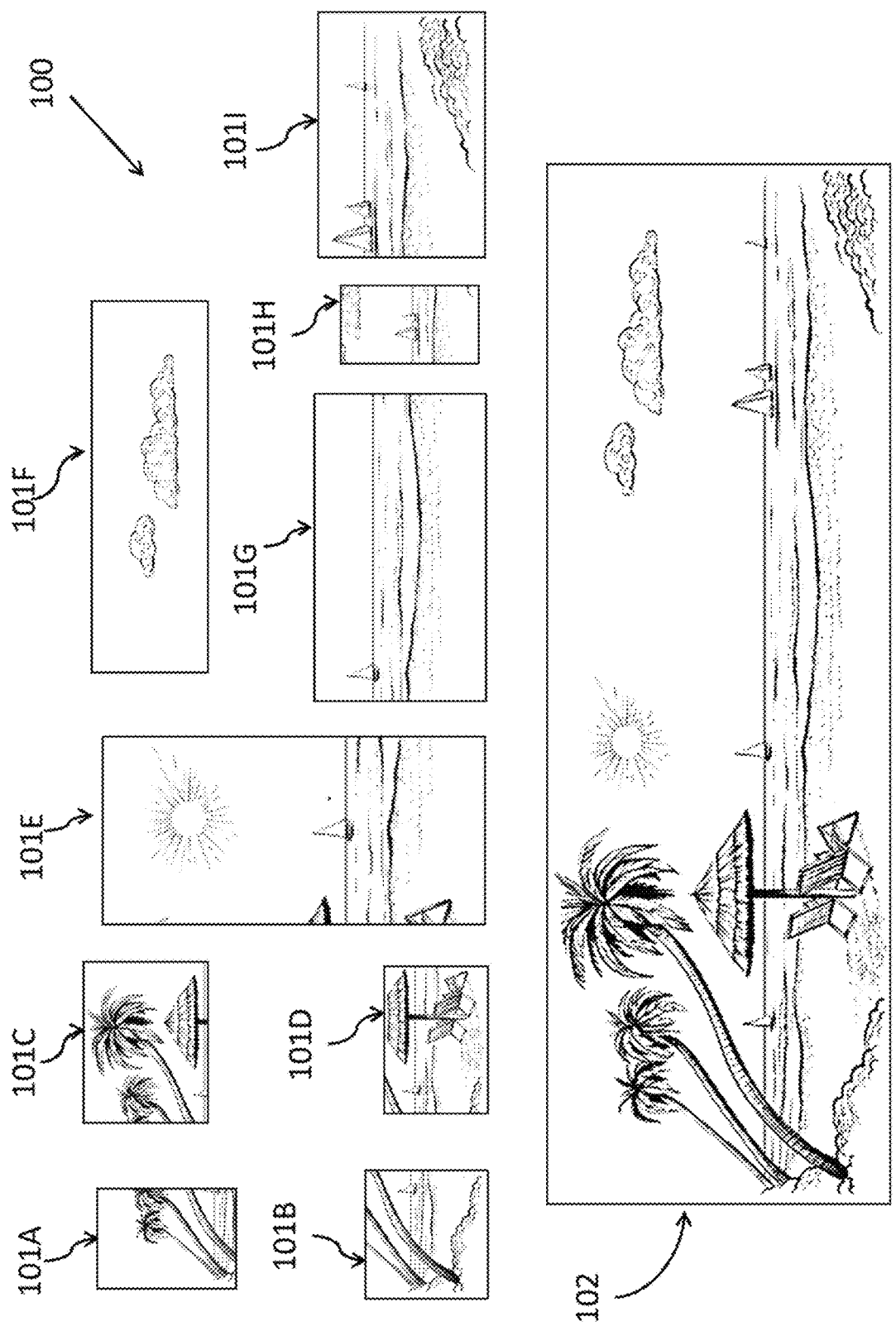
FIG. 1 illustrates a block diagram of a merging captured content into Combined Content in accordance with an exemplary embodiment.

The following detailed description outlines possible embodiments of the proposed system and method disclosed herein for exemplary purposes. The system and method disclosed are in no way meant to be limited to any specific combination of hardware and software. As will be described below, the system and method disclosed herein relate to the creation of a CC set that is composed of multiple Content sets. An exemplary embodiment of the environment in which the original Content is captured is illustrated in FIG. 1, which includes the components described below. It should be appreciated that each of the components are illustrated as simple block diagrams, but include the requisite hardware and software components needed to perform the specified functions as would be appreciated by one skilled in the art.

For example, one or more of the components described below can include one or more computer processor units (CPUs) configured to execute software programs stored on electronic memory in order to execute the algorithms disclosed herein, and these CPU may be located together or apart.

For example, but not limitation, FIG. 1 is a basic explanatory example of the merging of Content to make a more robust and complete CC. In this case a collection of images (101A through 101I) are each individual Content sets and they are captured by more than one capture devices (for example 101A, 101B, 101C, and 101D were captured by individual Content capture device X and 101E, 101F, 101G, 101H, and 101I were captured by individual Content capture device Y). All of the Content is collected into a common Original Content Library and based on a set of rules the Content is merged together in a coordinated manner (that may be synchronized and or harmonized) by a Content Integration and Combining Processor. The resulting merged Content is reviewed by a Content Combination Review and Enhancement Processor to ensure that the merged Content is complete and compliant with the established rules. If the merged Content is not in compliance, then the Content Combination Review and Enhancement Processor acts to bring the merged Content into compliance and may add and/or create additional content to complete the CC. Once the merged Content complies it is CC and may be distributed in accordance with the distribution rules. In the given example the Content captured may be still images, audio, video (with or without audio), game content, or other similar material. Also, the capture of the Content may occur simultaneously in parallel across one or more devices at once or over time. Additionally, the Content capture may be sequential or a mix of parallel and sequential.

In this invention, Content includes but is not limited to, audio (in any digital format, e.g., aa, flac, mp3, way, wma, etc.), images (in any digital format, e.g., JPEG, TIFF, GIF, BMP, PNG, SVG, pdf, etc.), video (in any digital format, e.g., AV1, VP9, FLV, AVI, MOV, WMV, MPEG-4, MPEG-2, MPEG-5, HEVC, SD/HD/4K/8K/16K, etc.), LIDAR, text (in any digital format, e.g., txt, asc, etc.), video game content (in any digital format or language e.g., C++, Java, HTML5, CSS3, JavaScript, SQL, etc.), Computer Generated Imagery (CGI), Virtual Reality/Augmented Reality/Mixed Reality (VR/AR/MR), visible, invisible, thermal images, medical records, seismic data, gravitational data, electromagnetic, IR, MRI, NMR, X-ray, UV, radio, or any other similar digital data in any digital format, and descriptive metadata related to or that describes any of the types of digital content. Additionally, the system can also begin with analog content which can be converted to digital content and then the process can proceed as if it started with digital content. Furthermore, the system may transcode between different formats to allow them to be harmonized and combined in a coherent way. Transcoding may occur more than once in the system to successfully complete the process.

Furthermore, in the example of FIG. 1 the merged Content in compliance with the content combination rules results in the CC—image 102 in this example. It should be noted that the original Content that has been captured by multiple different capture devices has some common elements such that the individual Content sets can be merged in a meaningful way. But it should also be noted that the individual original Content sets are not identical, nor are they simply adjacent Content sets from the same Content capture device (such as panoramic picture setting on a smart phone camera), but rather, by way of example, some images overlap to different degrees, some leave gaps between them, some have different proportions, some have different resolutions, some have different pixel density, etc., yet still they are merged to create a broader field of view image 102.

Figure 2:
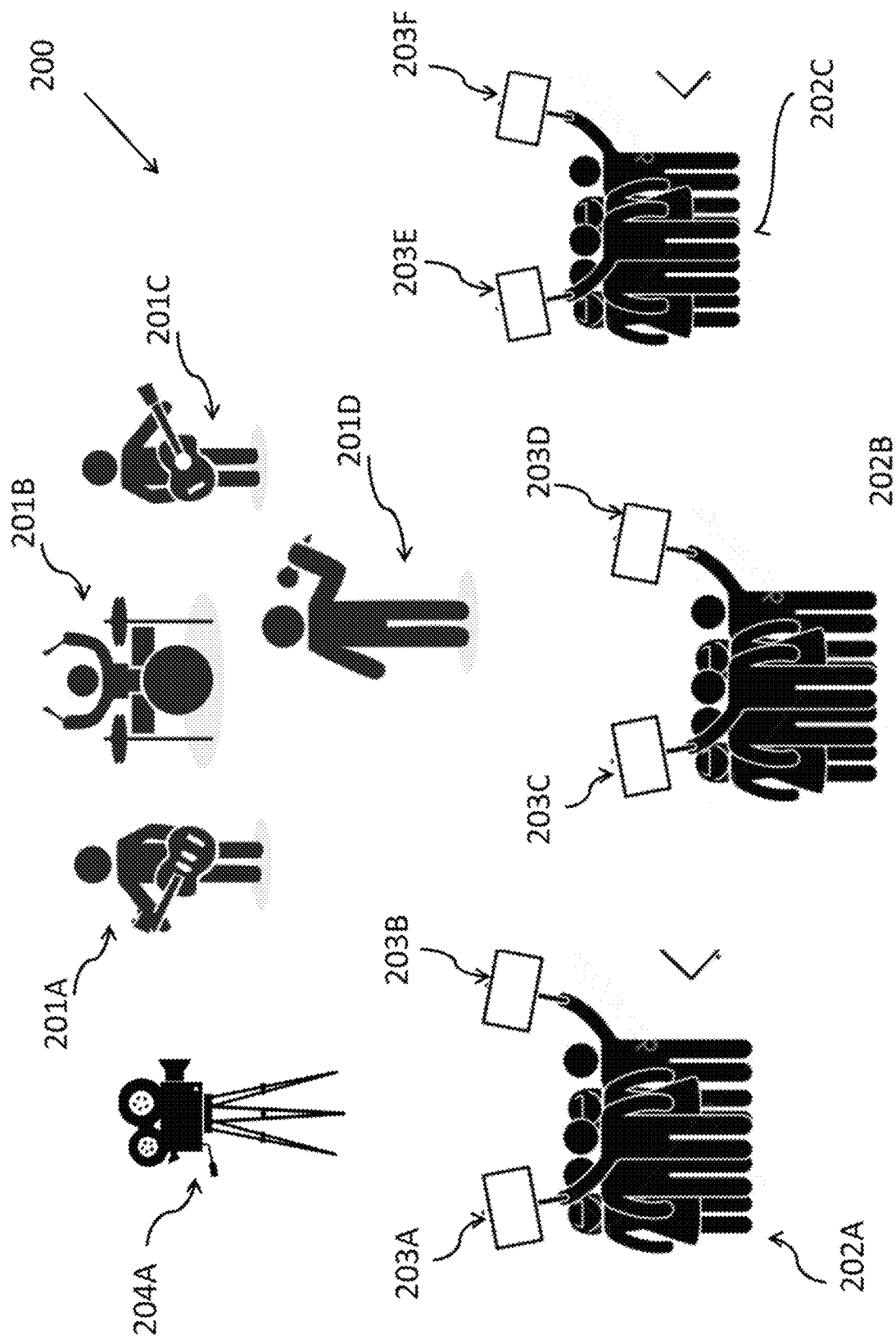
FIG. 2 illustrates a block diagram of a Content Capture environment in an entertainment venue in accordance with an exemplary embodiment.

For another example, but not limitation, FIG. 2 is a space (200) that could be a music concert arena. In the given example there are performers (201A, 201B, 201C, and 201D) on stage, and an audience consisting of members (202A, 202B, 202C, through 202$n$) (in the case of any given item with the extension "n" signifies any multiple observance of the same type, but different token of a given item greater than one). A subset of the audience (202) has Amateur Content Capture Devices (203A, 203B, 203C, through 203$n$). By way of example, but not limitation these Amateur Content Capture Devices (ACCD's) may be smart phones with cameras, or even drones with cameras. The ACCD's in general may have the ability, in addition to other possible functions, to capture one or more of the elements of Content. Furthermore, it may be the case that there are Professional Content Capture Devices (204A through 204$n$) (PCCD's) that are generally operated by professionals. The PCCD's in general also, may have the ability, in addition to other possible functions, to capture one or more of the elements of Content. In this example some members of the audience and some professional videographers all capture the performance by the performers, but each captures a unique Content set depending on their position, the time, of Capture, the relative quality of the Content Capture Device, and a variety of other differentiating qualities.

Figure 3:
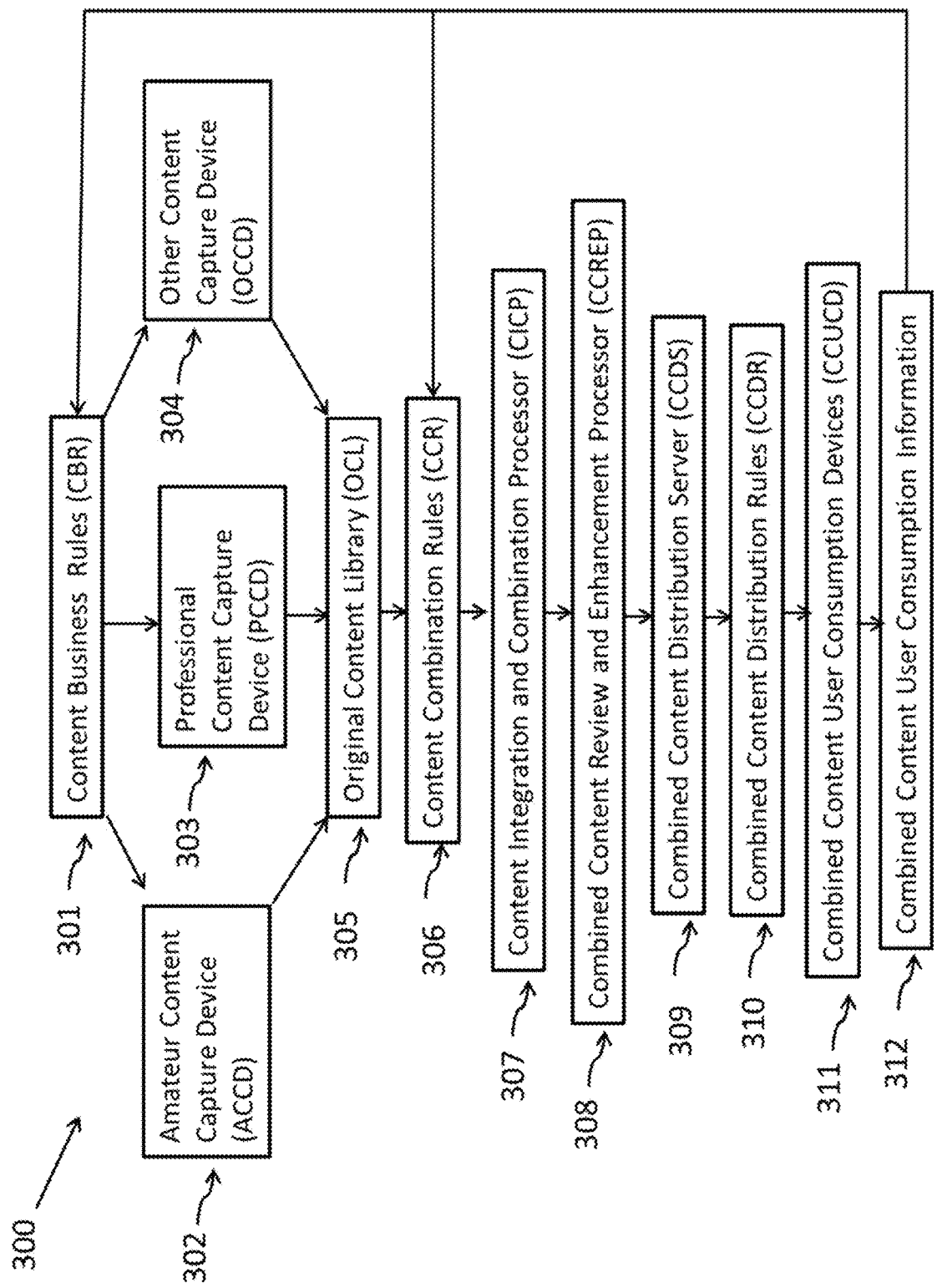
FIG. 3 illustrates a flowchart for a system of creating and distributing Combined Content in accordance with an exemplary embodiment.

As an example, but not limitation, FIG. 3 describes a system that can be considered a Content Combination and Management System (300). This system (CCMS) is capable of acquiring/receiving Content, organizing Content, combining Content based on rules, evaluating merged Content, distributing CC based on rules, analyze the use of CC, and then depending on the embodiment, revise and re-distribute the CC which may occur multiple times (sequentially and/or in parallel). The CC may be distributed toward users of various distribution systems and display device systems. These users may be an entire population, a sub-set of the population, or an individual. The CC can be real-time (e.g., live Content), or after real-time (e.g., pre-recorded Content), or spontaneously created Content or any combination of these types of Content. The specific components and functionality of the CCMS will be described in more detail below. It should be noted that each of the following items may be performed systematically and automatically without human intervention, or each may also be performed with a manual (human) over-ride (or a combination of both). Additionally, the rules of this system (300) may be pre-set or may be dynamically adapted in real-time (continuously or periodically), and the adaptations may be based on the information that is available at that time, and also as additional information becomes available the rules may be further dynamically (continuously or periodically) adapted. These changes may be based on either or a combination of human or ML/AI input and will be described in more detail below.

According to the exemplary aspect, the CCMS (300) has a set of Content Business Rules (301) (CBRs), which may be an extensive set of rules that can be used to set requirements or limitations on the Content that is placed in the Content Library. The CBRs Business Rules (301) can be stored in electronic memory, a rules database, or the like, for example. Moreover, these CBRs can cover a wide variety of things including or excluding, by way of example, but not limitation: Content inclusions, exclusions, placements, prioritization, weighting based on; content of the Content, Content type, Content capturer, Content source, title, subject matter, MPAA or other agency rating, intellectual property restrictions or requirements, rights, licenses, time of creation, language, duration, rating, geographic location, maximum length, minimum length, maximum number of results, minimum number of results, bit rate, Content dimensions, format, historical view count, "likes", reviews, date of creation, rates of completion, business rules, individualized or grouped preferences, individual or grouped viewership/sales trends, Content of a certain age, that includes certain elements, has resulted in a certain level of sales, has provided a certain quantity of viewership, is related to certain brands/personalities, or there is a desire to promote, and the like. While discussed more below, there may be different CC distribution rule sets based on attributes, including but not limited to; the viewer, subscription status, intellectual property rights, viewer profile, viewer age, viewing device, viewing time, viewing location, if the viewer is a person or machine, viewing history and the like. The different variable characteristics that drive the selection of the Content for the CC may be weighted in any proportion as deemed appropriate such that Content items may be specifically included, excluded, prioritized, and/or given a probability of being included in a final CC. Additionally, all of the Content Business Rules may be adapted and adjusted over time with feedback from the system helping to inform changes to the rules. Cumulatively, the CBRs (301) provide the definition of what Content is qualified to be included in the Original Content Library (OCL) (305) and even considered to be included in the CC that is to be distributed.

The Content that these CBRs apply to initially comes from three sources ACCDs (302), PCCDs (303), and Other Content Capture Devices (OCCDs) (304). As earlier discussed, these sets of Content may be a variety of different types of Content and may have a variety of other metadata associated with them. In general the ACCDs are amateur consumer devices of any quality level that individuals use to capture Content, the PCCDs are professional devices of any quality level that individuals with things such as more exclusive access rights may use to capture Content, and OCCDs are any Other Content Capture Devices that do not fall into the first two categories (or it is unknown what category the Content falls into—often older or archival Content is in this category). Some possible examples of OCCD content may be Content that is captured by autonomous or semi-autonomous capture systems, Content capture systems controlled by AI/ML computer systems, or URLs/links to other Content, advertising or marketing materials that may be added to the CC. Based on the CBRs the Content may be added to the OCL (305). All the Content capture devices (302, 303, & 304) are configured to be capable of capturing Content and transferring it to the OCL (305). The Content may be transferred to the OCL (305) by a variety of means, including but not limited to wireless (e.g., 3G, 4G, 5G, etc.), wired, Wi-Fi, Bluetooth, private or public wireless internet protocol (IP) technologies, amongst others (the transfer or stream may be initiated via; a push command, a pull command, or a combination of both). Furthermore, these rules may change over time. In one exemplary embodiment, the CBRs (301) may define certain classifications of videos based on a corresponding Content trait or element and restrict the selection of videos which match that classification from being included in the OCL. The OCL (305), is configured to receive Content and can store Content as a Content database, data store and the like. This may be a centralized or decentralized storage that may occur in a single physical location or is distributed through the Cloud.

In an example embodiment, each video may be stored with associated metadata. The OCL (305) is configured to be able to use metadata and/or elements in the Content itself to help classify, characterize, and organize the Content. For example, all videos relating to an individual event (e.g., a Rolling Stones concert on a specific date in a specific location) can be grouped together. Similarly, all videos related to a specific NFL game could also be grouped together.

The Content Combination Rules (CCR) (306) provides a set of rules dealing with amongst other things how the Content in the OCL should be merged together to create a satisfactory CC set. The CCRs (306) can be stored in electronic memory, a rules database, or the like, for example. In the example of video content the CCR may require things such as, but not limited to, the Content to be combined to all be from the same event, all have a consistent frame rate, all have a consistent aspect ratio, all have synchronic capture times, all have close to adjacent or overlapping Content capture fields of view, or the Content has to be transcoded, or otherwise manipulated, or additional CGI Content needs to be created, etc. to satisfy the CCR. The CCR may also take into consideration that there are rights to use the Content to be combined. Furthermore, for example, the CCR may also include business rules dealing with how, when, where, and to whom, advertising and/or marketing materials may be added to the CC. Additionally, the CCR may be informed and adapted based on information related to the CC that is fed back by the Combined Content User Consumption Information (312). This feedback loop helps to ensure that the CC may be improved to best meet the goals of the process.

The CCR provides the rules for the Content Integration and Combining Processor (CICP) (307) to combine the individual Content sets into various CC data sets. The CICP (307) is configured to assemble more than one Content sets into at least one Combined Content set. This processor may utilize various metadata attributes in the Content or elements in the Content itself and ML/AI to interpret or identify the data contained in the Content to precisely understand the nature of each Content data set such that they can be smoothly integrated together to ensure a coordinated, robust, and coherent CC data set that satisfies the CCR after they are merged.

The Combined Content produced by the CICP is reviewed by the CC Review and Enhancement Processor (CCREP) (308). The CCREP is configured to utilize a variety of analysis techniques (for example video interpretation systems that may be controlled by ML/AI processors using traditional or quantum computing techniques) to review the CC to see if there are any gaps, inconsistencies, or other non-compliance with the rules. If there are, gaps, inconsistencies, or other items of non-compliance with the rules the CCREP may look to the OCL for additional Content to fill the gaps and if there is not any and the CCR requires it the CCREP may create new computer generated Content to fill in the gaps and allow the CC set to be as complete, consistent, and coherent as possible—complying with the rules (and providing as best a user experience as possible). The resulting CC set(s) may, most likely be different from any of the individual original Content sets that were used to create the CC set(s). Additionally, if something in the Content must be excluded or obfuscated (e.g., blurred out items that there are not rights to) for any reason, the CCREP may remove, blur, replace, or add overlay(s) to the element of the Content.

Once the CC is complete and compliant with CCRs and is of sufficient quality the CC is placed on the Combined Content Distribution Server (CCDS) (309). The CCDS may be a single server or a distributed set of servers (including processors and databases or similar structures) that may be accessed by a user through a variety of means, including but not limited to wireless (e.g., 3G, 4G, 5G, etc.), wired, Wi-Fi, Bluetooth, private or public wireless internet protocol (IP) technologies, amongst others for the transfer or broadcast of CC. The CCDS is configured to distribute at least one CC set to at least one CCUCD. However, distribution to any given CCUCD of any given CC set is managed by Combined Content Distribution Rules (CCDR) (310). These rules ensure, amongst other things, that a user has the technical capacity, necessary rights or qualifies under the rules to consume the CC. Additionally, these rules may address the addition of advertisements in CC for users that get the CC for free and exclude the advertisements in CC for users that pay subscription fees. The CCDRs (310) can be stored in electronic memory, a rules database, or the like, for example.

As the CC is transferred to and consumed by users (the transfer or stream initiated via; a push command, a pull command, or a combination of both), the consumption metrics are captured and processed by Combined Content User Consumption Devices (CCUCD) (311). The CCUCD may be any device that can support the presentation of the CC to a user (e.g., a smartphone, tablet, personal computer, computer system, laptop, media streamer, smart TV, smart home speaker, game console, AR/VR/MR viewers, smart home appliance, an AI/ML system, a viewing device with a set-top box type processor, or the like). The CCUCD reviews and aggregates the usage information and creates a feedback loop to help inform and improve the CBR, the CCR, the CICP, the CCREP, and the CCDR to continuously improve the user experience with the CC. The CC may use this feedback loop to improve over time, and it may also may use OCCD, ACCD, and PCCD that may be added to the OCL over time and as the additional Content is interpreted and combined with the earlier CC in accordance with the various rules, the resulting CC continues to be improved and becomes more robust to more successfully achieve the process goals. This process of improving the CC may also result in more efficient use of bandwidth, processor resources, server resources, and most valuably, the user's time. It should be noted that these cycles may occur in parallel, sequentially, or a combination of both to individual or groups of users.

It should be noted that the OCL, CCR, CICP, CCREP, CCDS, CCDR, & CCUCD collectively or any subset of these may be housed together or separately (in a given physical location, or locations or in distributed in non-specific cloud environments). Individually, collectively, or subsets of these may be local to or apart from any or all the ACCDs, PCCDs, OCCDs, or CBRs, as well as any users. In the example case the steps follow the above described given order, but it should be recognized that any or all of the steps can be done simultaneously, in parallel, in different order, repetitively, different groups of data being processed at different times, iteratively processed, partial processing of different Content and or CC data sets may be completed and others not completed, each and every process may be completed in part or in whole.

Figure 4:
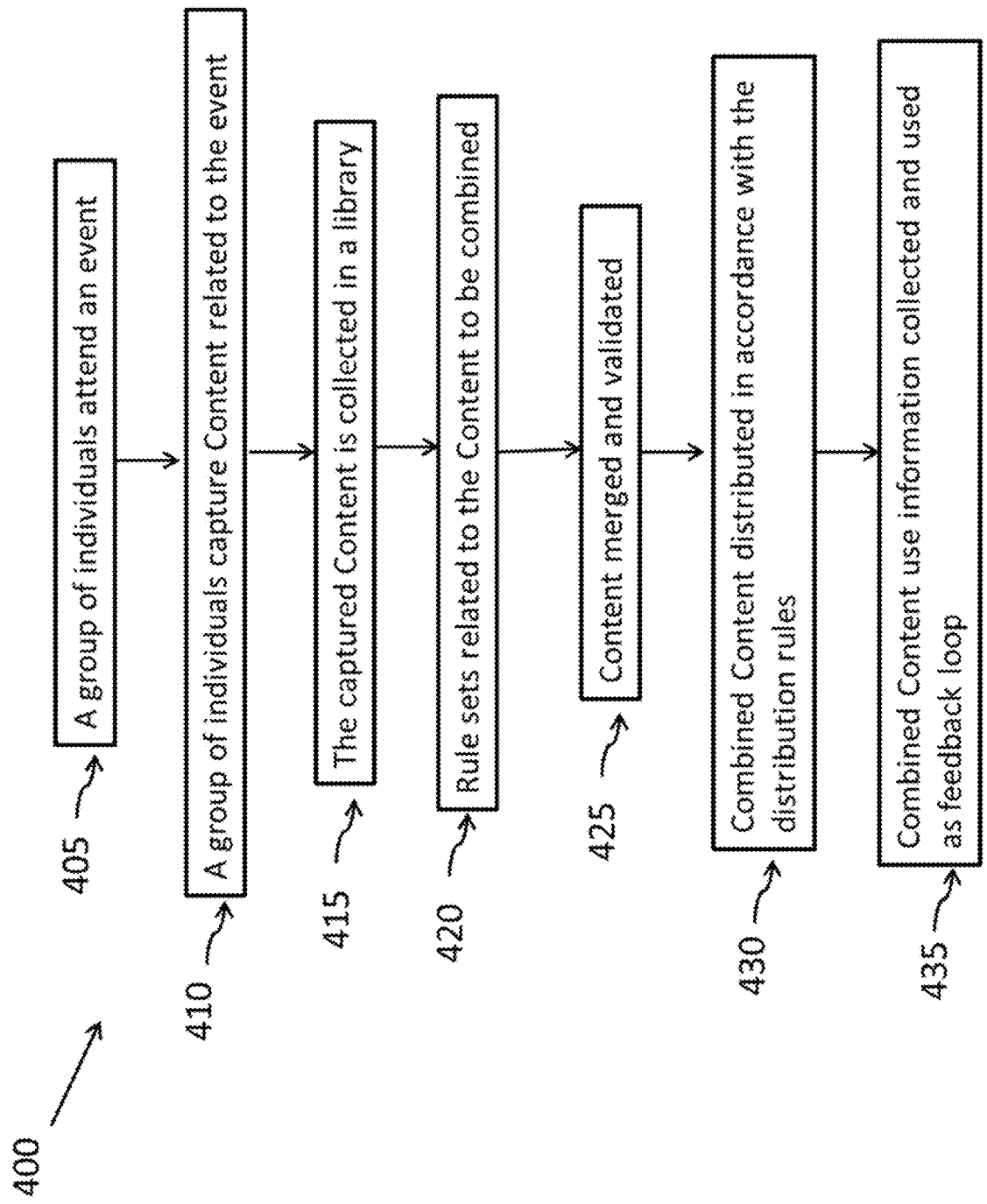
FIG. 4 illustrates a flowchart for a method of creating and distributing Combined Content in accordance with an exemplary embodiment.

FIG. 4 illustrates a flowchart for a method according to an exemplary first embodiment. Initially, more than one individual (it could be multiple amateur Content capturers, or multiple professional Content capturers, or one or more of each) are at a general location (405) or attend a common event. For example, there is a group that attends a music concert. At the concert more than one individual uses a content capture device, creating Content (410). For example, more than one person uses their smart phone video camera to capture Content of the concert. These individuals are each capturing the same event, but they are at different precise physical locations (same event—but different devices). For example, the Content includes images of the concert and sounds of the concert, but each from a different perspective, each with a specific limited field of view. The captured Content also includes metadata with information such as the location of the camera when the Content was captured, the timing of the Content capture, and other technical details about the Content.

Furthermore, in the given embodiment, the ACCD may also have a computer program resident on the device—an application also known as an "app" (especially for example, on a smartphone). This app is able to more easily allow for Content capture and Content transfer to the OCL, ensuring that all the related required Content and metadata is included in what is transferred (the transfer or stream may be initiated via; a push command, a pull command, or a combination of both) to the OCL. The app may also help in providing metadata to help align the captured Content with the rules facilitating the merging process. The PCCDs, as well as, the OCCDs may also have a similar app resident on the device(s). Furthermore, this app may also serve as the platform for the CC display on the CCUCD (including helping to manage the CCDRs). The app may additionally provide the playout interface. There may be a master app that individual CC sets are played-out on. The individual CC sets may have unique rules around them such that specific permissions are required for playout. For example but not limitation, only a user that has purchased a ticket to a concert is able to add Content and also playout CC (in real time or after the event), or only a user that has captured Content has the right to playout CC, etc.

In the exemplary case the individuals that capture Content may have an app on their smart phone that eases the process of transferring the Content (including the related metadata) to the OCL (415). The ACCD Content, the PCCD Content (in the example this is Content captured by the official professional venue video crew—this Content is often shown on big video screens in the venue), and any OCCD are all sent to and organized within the OCL. A set of rules is applied to the Content to make sure that the Content that is processed adheres to a set of rules (420). These rules can fall into broad categories around technical specifications (to insure quality & consistency), legal & regulatory limitations (to insure compliance with Laws), business limitations (to ensure contractual and rights compliance, as well as, ensuring the most profitable Content is processed), efficiency (to ensure bandwidth, processors, and storage are most efficiently utilized), and user satisfaction with the CC.

In the example case after the CCR is applied to the Content in the OCL the qualifying Content sets are merged (425) by the CICP. The merger process can take many different approaches and can result in one or multiple different types of CC sets all related to the same event. For example the CICP may utilize Content and related metadata (including but not limited to timing data, location data, content identification tags, proximity data, inclination data, movement data, camera setting data, microphone setting data, etc.) from multiple ACCDs (e.g., smart phone cameras, GoPros, Drones, etc.), OCCDs, and PCCDs to be used by the CICP (which may include ML/AI systems using traditional computing or quantum computing techniques) to merge original Content together (in parts or whole) to create a single CC set. Since the CC is the product of multiple Content capture devices from different perspectives it is likely the case that the CC field of view is more expansive than any of the individual original Content sets. Additionally, since the CC is the product of Content from multiple perspectives the resulting CC may take multiple individual standard two dimensional images and collectively make them to be three dimensional (3D—with the appearance of depth)—also, not just the appearance of single perspective 3D but truly holographic (with multiple perspectives). Or alternatively, but similarly, the same could be done with video Content efficiently creating VR/AR/MR content at scale (creating immersive experiences with individualized point(s) of view). Furthermore, Content that is captured physically closely together (e.g., with overlap) may be merged to improve CC image quality (improved clarity, reduced jitter, reduced image degradation) even if the field of view is not materially increased. Also, master audio captured by PCCDs may be added to the images captured by the ACCDs to create an improved CC experience. Alternatively, audio may be captured from a variety of PCCDs and ACCDs to provide enhanced multi-channel (surround sound) audio and this multi-channel (3D/holographic audio) could be coordinated with the 3D/holographic images to create true location specific media Content experiences. Furthermore, this processing could happen in real-time (or near real-time) enhancing live experiences for users at events (e.g., getting instant re-plays of sports plays from multiple perspectives/points of view) or as after the fact on-demand replayed experiences.

Furthermore, the CICP in conjunction with the CCREP will evaluate and review the resulting CC. Upon review if the CC is in compliance with the CCRs, complete, and coherent without the need of the addition of additional content the CC will pass on to the CCDS. If the CC is not in compliance, complete, or coherent the reason for failure will be identified and if possible the errors will be resolved to bring the CC into compliance (including the addition and/or creation of additional content if needed). A variety of approaches may be used including ML/AI tools (for merging, testing, repair, creation, addition, and re-testing through an iterative approach—using traditional computing and quantum computing methodologies—individually or in combination). The CCREP & CICP may use computer Content generation techniques to do things like filling in gaps in the original source Content to make the CC better aligned with the CCR.

Once the CC is in the CCDS, CCDRs are applied to ensure the proper CC can be broadcast or transmitted toward (the transfer or stream initiated via; a push command, a pull command, or a combination of both) and delivered to the proper user(s) (and user(s) CC consumption devices) (430). The CCDR can include rules, amongst others related bandwidth and bitrate related to the CC, the format of the CC, the rights required for consuming the CC, etc. Additionally, the CC may be distributed in part or in whole, periodically or continuously, streamed, or downloaded or any combination of these. Furthermore in the exemplary embodiment, it could be the case that those individuals at the event that used their smart phone cameras and the given app to capture Content and send the Content to the OCL have additional rights. These users with the app may have specific rights to consume the CC and enjoy an enhanced experience while they are at the event and after they had attended the initial event.

Following, the distribution of the CC the use of the CC is measured, analyzed, reported on, and used as a feedback loop to influence the entire system (435), most notably the CBRs and the CCRs. The CC usage data may be captured at the individual user, device, time level and may be aggregated at the individual, population, or sub-set level. This usage data may be analyzed through a variety of human or ML/AI means to find correlations (causative or not) between various sets of CC, CC consumption behavior, and goals. It is further noted that the discovered relationships between CC as delivered and user behavior may be utilized to create new or alternative goals. The capture of CC consumption data may be collected through a variety of means including, but not limited to, CCDS distribution information, distribution network packet transfer information, and/or user device (e.g., video player) usage reporting, as well as, other secondary systems that may be queried such as product sales systems, inventory systems, product search systems, and the like. As noted earlier, the CC usage history may include which CC is consumed in their entirety, which CC is skipped after a short period of time, what is trending CC for other users, which CC is correlated with sales of products included in the CC, which CC drives high user engagement, and the like. Through analysis of this information playlists that have a higher likelihood of achieving the goals may be created and these insights may be fed back into the system to update the CC creation process dynamically or periodically. Additionally, any of these types of analyses may be applied to original Content that is fed into the OCL to improve the creation of CC. Over time as new or additional Content is added and CC is consumed the process continues to improve creating CC experiences in compliance with the rules.

In an alternative embodiment randomization may be included in the CCRs that are applied to create the CC. The weighting(s) of any given Content (or subset of Content) may be established by an individual or by a system and take into consideration, by way of example, but not limitation, Content that is generally preferred by the Content creator, the CC consumer, provider featured Content, timely Content, Content that is ranked highly by various statistical models, Content or Content types selected or preferred by the user (or other users), etc. The CC sets may each be unique down to the time of playout on a device level. Thus, the randomization rules may be applied each time a user requests the start of a CC set. Furthermore, the randomization and randomization rules can be created and applied by the CICP or CCDS rather than by the CC consumer. Also, in an alternate embodiment, the randomization rules may be implemented on the user's consumption device and applied to the CC after it is received by the consumption device and stored in the memory buffer or applied as the user(s) device requests a playlist from the CCDS. A variety of standard randomization approaches may be used, including but not limited to any one of the following techniques (or a combination of multiple techniques, with or without element repetition, and with or without sequencing); simple, replacement, block, permuted block, biased coin, minimization, stratified, covariate adaptive, and response adaptive. In application and testing of the various randomization techniques subject blinding may be used. This variety of presentations that is achieved through randomization provides additional observations related to the performance of different CC in different sequences that may be used to further improve optimization analyses and resulting CC.

Please note, this system does not require any explicit user to initiate this system. However, user information may be used to ensure that the more relevant CC is presented to the user and as such the user will engage deeper and for longer periods. In extreme cases individual CC sets may be created for each individual user.

Additional embodiments of the present invention may be related to dynamic storytelling. This invention may be used to create actual stories or story lines for CC (including videos, text based stories, audio stories, video games, etc.) such that non-predetermined stories may be created for individual users or groups of users. Furthermore, these non-pre-determined stories may interact with each other such that multiple users may collectively experience related, intertwined, but individualized "stories" especially as different individuals continue to add Content (e.g., multiple users playing the same video game—each with their own view and actions, and those different views are combined into CC). Additionally, ML/AI may be used to create, model, run test versions, monitor, analyze, and iteratively improve these CC sets. Furthermore, this invention may also be utilized in vastly different environments such as in biological evolutionary modeling or large group modeling where this system may be applied to review potential future states of organisms or populations.

Exemplary systems include systems; that recognizes an item (or sets of items) in source Content and identifies additional data or metadata about the identified item(s) and may recognize given items in the Content, as in U.S. Pat. Nos. 9,167,304, 9,344,774, 9,503,762, 9,681,202, 9,843,824, 10,003,833, 10,136,168, 10,327,016, the navigation of video content as in U.S. Pat. Nos. 8,717,289, 9,094,707, 9,294,556, 9,948,701, 10,270,844, sending of Content to different display devices as in U.S. Pat. Nos. 9,571,875, 9,924,215, the creation of virtual 3D content as in U.S. Pat. No. 10,356,338, and the creation of groups of content as in U.S. patent Ser. No. 15/725,802, the contents of which are hereby incorporated by reference.

Additionally, in one embodiment, the system either automatically, or in response to user control, launches an electronic shopping application enabling the user to purchase one or more of the displayed products. Exemplary applications include the electronic shopping systems disclosed in U.S. Pat. Nos. 7,752,083, 7,756,758, 8,326,692, 8,423,421, 8,768,781, 9,117,234, 9,697,549, 10,154,315, 10,231,025, 10,368,135, 9,947,034, 10,089,663, and 10,366,427, the contents of each of which are hereby incorporated by reference.

Figure 5:
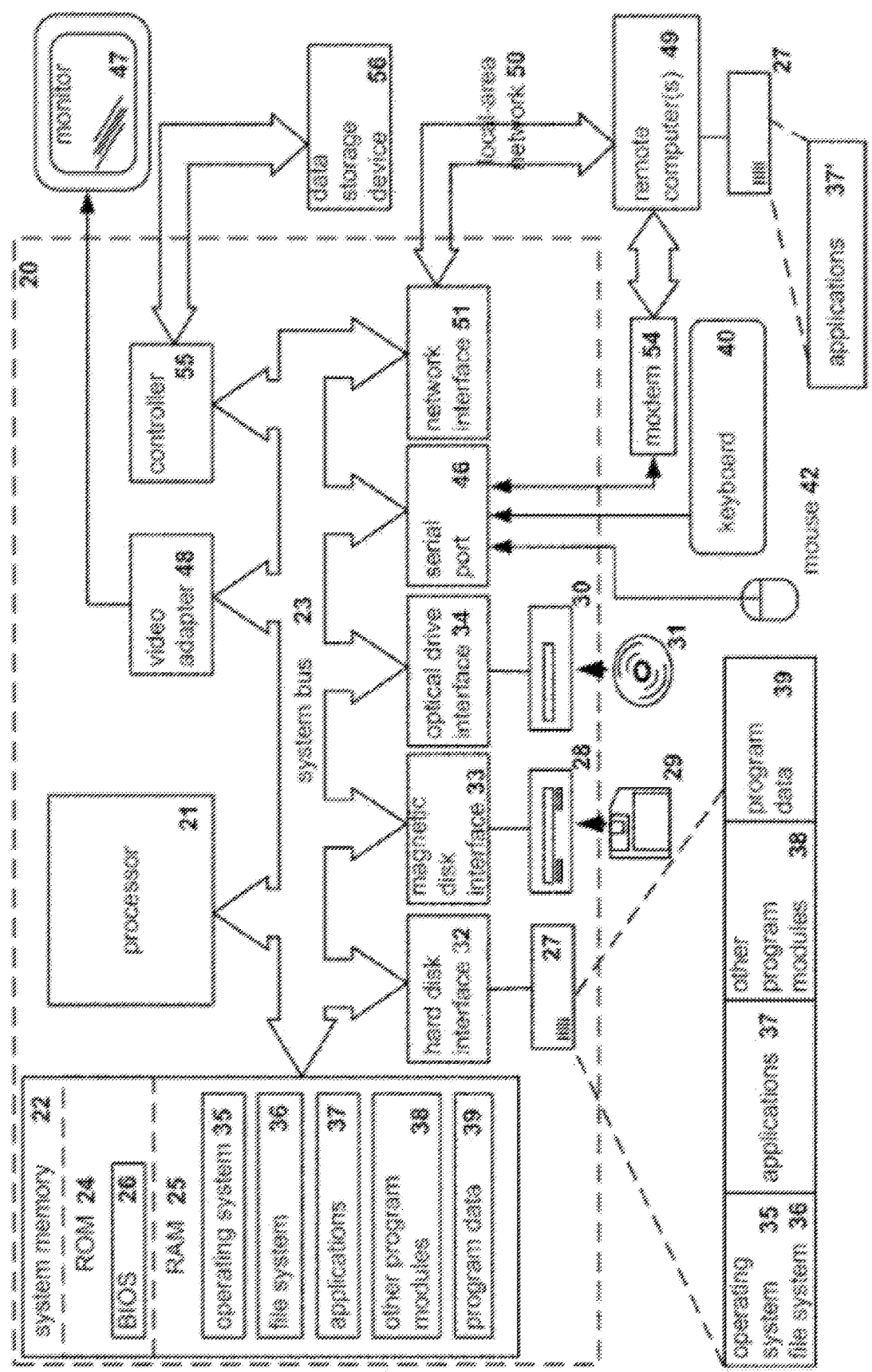
FIG. 5 illustrates an example of a general-purpose computer system in accordance with an exemplary embodiment.

FIG. 5 illustrates an example of a general-purpose computer system (which may be a personal computer, a server, or a plurality of personal computers and servers) on which the disclosed system and method can be implemented according to an example aspect. It should be appreciated that the detailed general-purpose computer system can correspond to the CCMS (300) described above with respect to FIG. 3 to implement the algorithms described above. This general-purpose computer system may exist in a single physical location, with a broadly distributed structure, virtually as a subset of larger computing systems (e.g. in the computing "cloud"), or a combination of any of these.

As shown, the computer system 20 includes a central processing unit 21, a system memory 22 and a system bus 23 connecting the various system components, including the memory associated with the central processing unit 21. The central processing unit 21 can be provided to execute software code (or modules) for the one or more set of rules discussed above which can be stored and updated on the system memory 22. Additionally, the central processing unit 21 may be capable of executing traditional computing logic, quantum computing, or a combination of both. Furthermore, the system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between parts of the personal computer 20, such as those at the time of loading the operating system with the use of the ROM 24.

As noted above, the rules described above can be implemented as modules according to an exemplary aspect. As used herein, the term "module" refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general-purpose computer. Accordingly, each module can be realized in a variety of suitable configurations and should not be limited to any example implementation exemplified herein.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20. Moreover, it is noted that any of the storage mechanisms (including data storage device 56, which may be amongst other things, physical hardware, CDN(s), or the "cloud") can serve as the storage of the media Content, including the Available Content Library (111) described above, according to an exemplary aspect as would be appreciated to one skilled in the art.

The present disclosure provides the implementation of a system that uses a hard disk 27, a removable magnetic disk 29 and/or a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, other computer systems, and so on. Such input devices usually plug into the computer system 20 through a serial port 46, which in turn is connected to the system bus, but they can be connected in other ways, for example, with the aid of a parallel port, a game port, a universal serial bus (USB), a wired network connection, or wireless data transfer protocol. A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49, which can correspond to the remote viewing devices, i.e., the IP connected device (e.g., a smartphone, tablet, personal computer, laptop, media display device, or the like). Other devices can also be present in the computer network, such as routers, network stations, peer devices or other network nodes.

Network connections 50 can form a local-area computer network (LAN), such as a wired and/or wireless network, and a wide-area computer network (WAN). Such networks are used in corporate computer networks and internal company networks, and they generally have access to the Internet. In LAN or WAN networks, the personal computer 20 is connected to the network 50 across a network adapter or network interface 51. When networks are used, the personal computer 20 can employ a modem 54 or other modules for providing communications with a wide-area computer network such as the Internet or the cloud. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A system for storing at least more than one content set, combining at least more than one content set into at least one combined content set such that the combined content set has a larger field of view than any individual content set, and transmitting at least one combined content set toward at least one combined content user combined content consumption device, the system comprising:
   at least more than one content capture devices configured to capture at least one set of content, the at least more than one of the content capture devices configured to transmit at least one set of content towards a database;
   at least one electronic database configured to receive and store at least more than one content set;
   at least one processor communicatively coupled to the at least one electronic database, the at least one processor configured to:
   (1) scan the at least more than one content sets and dynamically compare the content sets;
   (2) access information stored in at least one database that contains a collection of at least one content combination rules related to the combination of the at least more than one content sets;
   (3) apply at least one content combination rule to the at least more than one content sets to combine at least a portion of at least more than one content sets into at least one combined content set;
   (4) review the at least one combined content set and add any needed additional content to ensure the at least one combined content set is complete;
   (5) access information stored in at least one database that contains a collection of at least one combined content set distribution rules related to the distribution of the at least one combined content sets; and
   a server configured to transmit the at least one combined content set towards a display device in accordance with the combined content distribution rules.

2. The system of claim 1, wherein video is part of the content.

3. The system of claim 1, wherein audio is part of the content.

4. The system of claim 1, wherein images are part of the content.

5. The system of claim 1, wherein metadata is part of the content.

6. The system of claim 2, wherein the video is live.

7. The system of claim 2, wherein the video is prerecorded.

8. The system of claim 3, wherein the audio is live.

9. The system of claim 3, wherein the audio is prerecorded.

10. The system of claim 4, wherein the images are live.

11. The system of claim 4, wherein the images are prerecorded.

12. The system of claim 5, wherein the metadata is live.

13. The system of claim 5, wherein the metadata is prerecorded.

14. The system of claim 1, wherein the at least one processor comprises:
   a first processor configured to scan the at least more than one content set contained in the at least one content database and combine the at least more than one content set in accordance with at least one combination rule contained in at least one content combination rule database into at least one combined content set;
   a second processor configured to access information stored in the at least one electronic database that is related to the at least one rule for content combination and combine the more than one content set in accordance with the at least one combination rule;
   a third processor configured to review the at least one combined content set and add any needed additional content to ensure the at least one combined content set is complete;
   a fourth processor configured to access the information stored in at least one electronic database that is related to the rules for at least one combined content set distribution;
   a fifth processor configured to transmit at least one combined content set toward at least one combined content consumption device in accordance with the at least one distribution rule.

15. The system of claim 1, wherein the at least one electronic database comprises a first electronic database storing at least one content set, a second electronic database storing the information related to the at least one rule for combining the at least more than one content set into at least one combined content set, and a third electronic database storing the information related to the at least one rule for distribution the at least one combined content set.

16. The system of claim 1, wherein the processor is further configured to analyze at least one user combined content set consumption information set.

17. The system of claim 1, wherein the at least one user combined content consumption information may influence at least one rule for content capture.

18. The system of claim 1, wherein the at least one combined content user consumption device is at least one of a smartphone, a tablet, a personal computer, a computer system, a laptop, a media streamer, a smart TV, a smart home speaker, a game console, an AR/VR/MR viewer, a smart home appliance, an AI/ML system, a viewing device with a set-top box type processor.

19. A method for storing at least more than one content set, combining at least more than one content set into at least one combined content set such that the combined content set has a larger field of view than any individual content set, and transmitting at least one combined content set toward at least one combined content user combined content consumption device, the method comprising:
   a database to store at least more than one content set;
   accessing at least more than one content set stored in the at least one electronic database that is related to the at least more than one content set;
   accessing information stored in the at least one electronic database that is related to the at least one content combination rule set;
   combining the at least more than one content set into a combined content set in accordance with at least one combined content rule set;
   evaluating the resulting at least one combined content set and adding any needed content to create at least one combined content set;

accessing information stored in the at least one electronic database that is related to at least one distribution rule set;

transmitting the at least one combined content set toward at least one combined content display device in accordance with the at least one distribution rule set.

20. The method of claim 19, wherein the at least one processor:

scans the at least more than one content set contained in the content database and combine the at least more than one content set in accordance with at least one combination rule contained in a content combination rules database into at least one integrated combined content set;

accesses the information stored in the at least one electronic database that is related to the at least one rule for content combination and combine the content in accordance with at least one combination rule;

reviews the at least one combined content set and add any needed additional content to ensure the combined content is complete;

accesses the information stored in at least one electronic database that is related to the rules for at least one combined content set distribution; and transmits the at least one combined content set toward at least one combined content consumption device in accordance with the at least one distribution rule.

21. The method of claim 19, wherein the at least one user combined content consumption information may influence at least one content capture set.

* * * * *